Jan. 5, 1971  E. A. SMITH  3,552,103
INTERNAL COMBUSTION ENGINE AIR FILTER
Filed Nov. 26, 1968  2 Sheets-Sheet 1
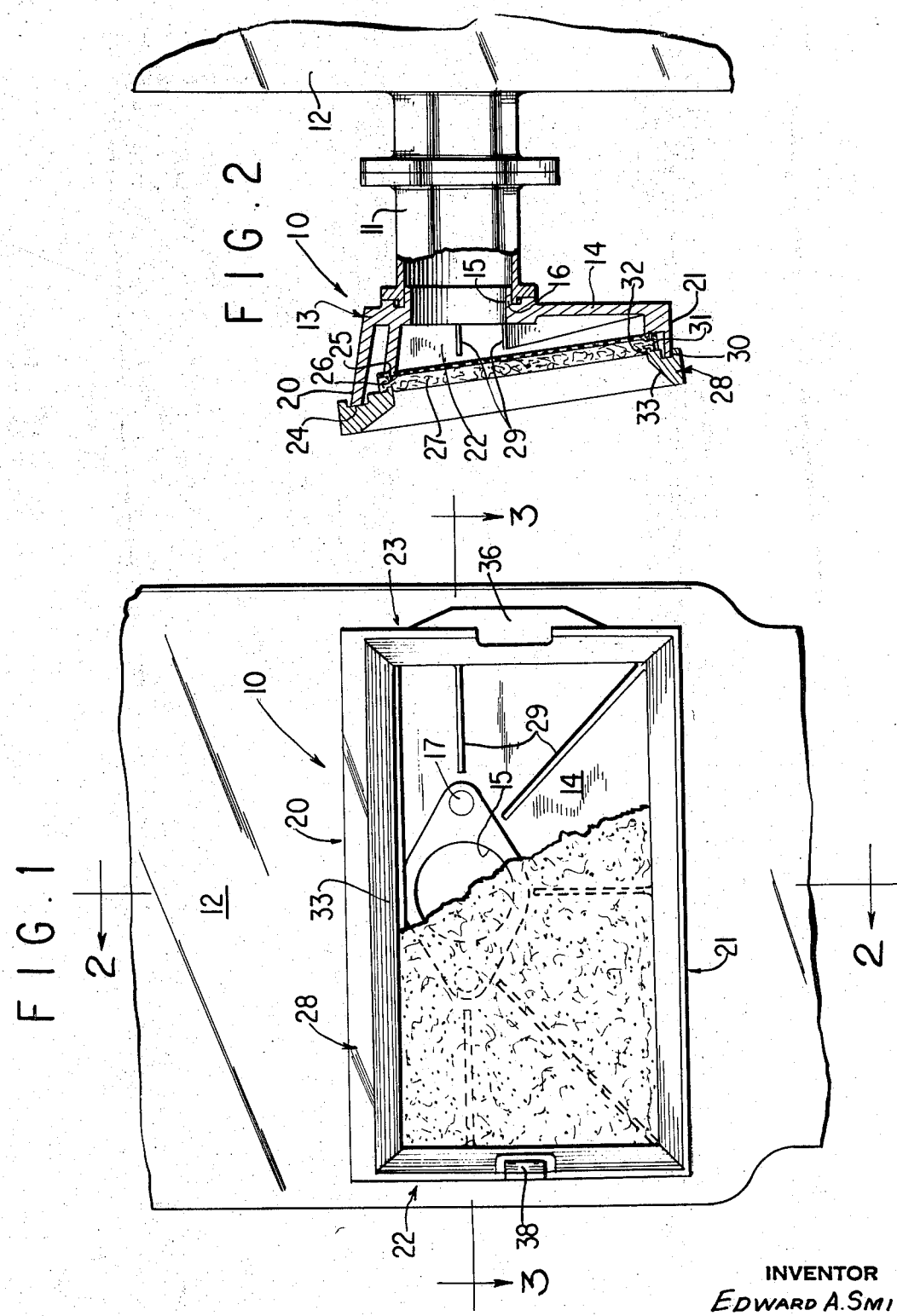
INVENTOR
EDWARD A. SMITH
BY
*Smythe & Moore*
ATTORNEYS

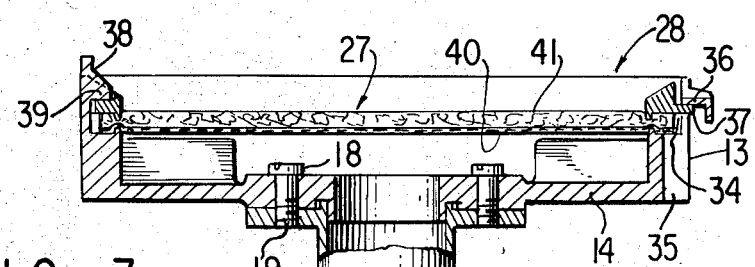
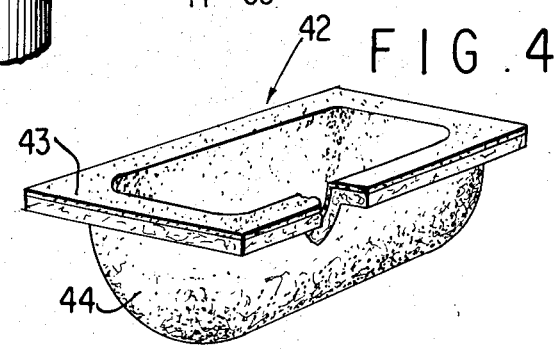
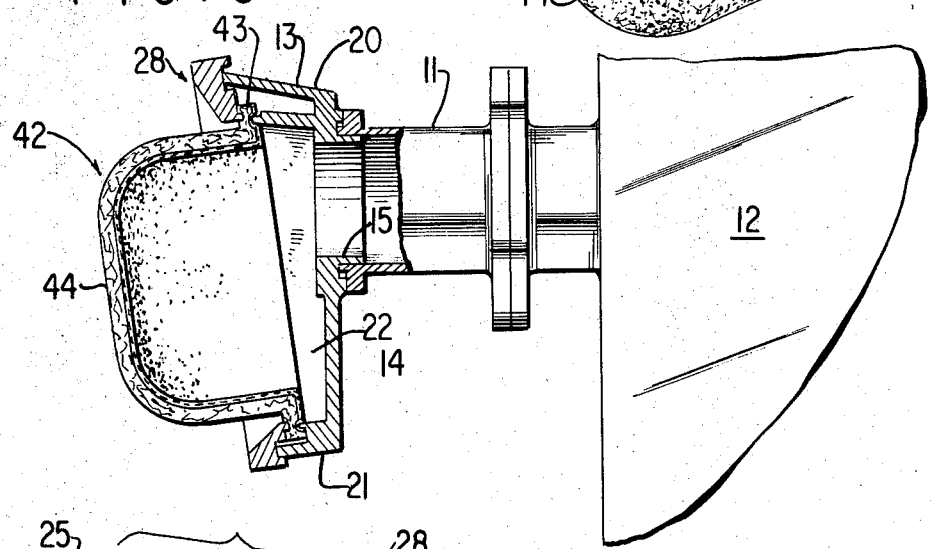
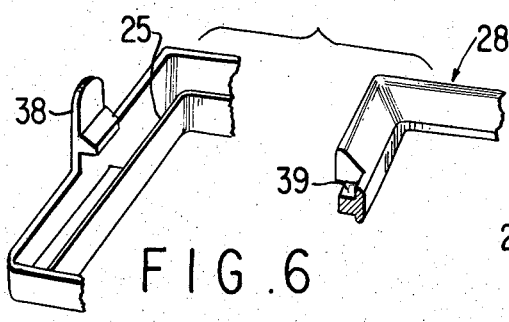
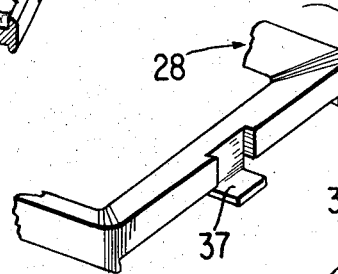
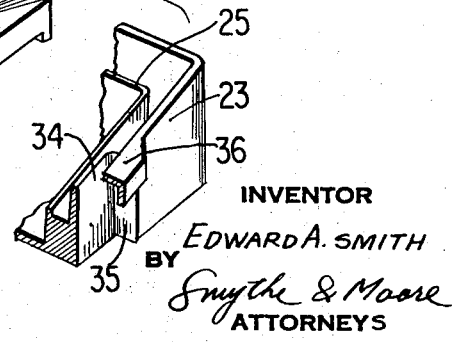
INVENTOR
Edward A. Smith United States Patent Office 3,552,103
Patented Jan. 5, 1971

3,552,103
INTERNAL COMBUSTION ENGINE
AIR FILTER
Edward A. Smith, Glenville, Conn., assignor to GAF Corporation, Glenville, Conn., a corporation of Delaware
Filed Nov. 26, 1968, Ser. No. 779,061
Int. Cl. B01d 27/08
U.S. Cl. 55—486                                    7 Claims

ABSTRACT OF THE DISCLOSURE

A holder for a filter element wherein the filter element is clamped between inner flanges formed in a base and a retaining ring. The retaining ring is detachably attached to the base and the base is provided with an opening connectable to the air intake of an engine. Upstanding supporting ribs are provided on the bottom wall of the base to support the inner portion of a flat filter element. The filter element may have an outer layer of a chemical and weather resistant porous material.

The present invention relates to air filters for small internal combustion engines and particularly to a holder for the filter element.

It is known to use air filters on power lawn mower internal combustion engines to provide clean air. The air filter must be simple in construction yet must be effective to remove dirt and dust from the air drawn into the engine.

One of the objects of the present invention is to provide an improved holder for retaining the filter element at the air intake of an engine.

Another object of the present invention is to provide a simple yet effective structure for a filter element holder so that the filter element may be easily replaced.

In one aspect of the present invention, there may be provided a base having a bottom and side walls upstanding therefrom. The bottom wall is provided with an opening which is connectable to the air intake of the engine upon which the filter is to be mounted. A flange is provided on the base inwardly of the side walls for supporting the edges of the filter element. A retaining ring is mounted on the upper edges of the side walls and has a flange therein which cooperates with the base flange whereby the edges of a filter element can be clamped between the cooperating flanges. A detachable snap fastener arrangement is provided for detachably clamping the retaining ring onto the side walls of the base. The filter element preferably is of a multi-layer construction and may be flat or bowed outwardly with respect to the bottom of the holder. The outer layer of the filter element may be chemical and weather resistant. When a flat filter element is used, a plurality of upstanding ribs are provided on the bottom wall of the base to support the inner portions of the filter element.

Other objects, advantages and features of the present invention will become apparent from the accompanying description and drawings, which are merely examplary.

In the drawings:

FIG. 1 is a side plan view of the filter element holder according to the present invention mounted on the air intake of an engine, with a portion of the filter element broken away;

FIG. 2 is a sectional view taken along the line 2—2 of FIG. 1, a portion being broken away;

FIG. 3 is a sectional view taken along the line 3—3 of FIG. 1, a portion being broken away;

FIG. 4. is an overall perspective view of another form of filter element which can be inserted in the holder of the present invention;

FIG. 5 is a view similar to that of FIG. 2, but showing the filter element of FIG. 4 being retained in the holder;

FIG. 6 is a fragmentary broken perspective view of the cooperating portions of one end of the filter holder;

FIG. 7 is a fragmentary broken perspective view of portions of the other cooperating ends of the filter holder.

With particular reference to FIGS. 1 to 3, inclusive, the filter element holder according to the present invention is indicated generally at 10 and is mounted on an air intake 11 leading to engine 12. The holder 10 comprises a base 13 having a bottom wall 14 with an opening 15 therein provided with a flange 16, which is mounted on the opening of air intake 11. On both sides of opening 15 there are provided screw holes 17 (FIG. 1) through which are passed screws 18 (FIG. 3) which are threadedly received in corresponding openings 19 in a flange surrounding the air intake opening.

Base 13 is substantially rectangular in configuration, as may be seen in FIG. 1. Upstanding from the edges of the bottom wall 14 are longer side walls 20 and 21 and shorter side walls 22 and 23. Side wall 20 is higher than the opposed side wall 21 so that the plane defined by the upper edges 24 of the side walls is inclined with respect to the bottom wall 14, as may be seen in FIG. 2. Such will carry excess gas that might be spilled away from the filter face. Flange 16 can be made so as to be self-sealing.

Positioned inwardly from the side walls is a continuous flange 25 whose upper edge is lower than the upper edge 24 of the side wall. The flange 25 may be provided with an upstanding knife edge 26 which will be impressed into a face of a filter element 27 positioned on the flange 25 and clamped thereon by a retaining ring 28. Upstanding from the inner face of base wall 14 are a plurality of ribs 29 which radiate outwardly from intake opening 15.

The retaining ring 28 is provided with a continuous groove 30, which receives the upper edge 24 of the side walls. Inwardly of groove 30 there is similarly provided a flange 31 having a knife edge 32 which is impressed into the upper face of filter element 27. The upper surface of the retaining ring may be beveled inwardly as shown at 33 (FIGS. 1, 2).

Retaining ring 28 is detachably connected to base 13 by structural elements which are best illustrated in FIGS. 6 and 7. It is preferred that the base and clamping ring be made of a resilient plastic material, such as polyethylene, so that the fastening elements will snap together in a manner to be presently described. In side wall 23 of the base there is provided a slot 34 which is formed by indenting a portion of side wall 23 at 35. A reinforcing lip 36 may be provided at the upper edge of the side wall. Received in slot 34 is a tab or lug 37 formed on the corresponding end of retaining ring 28. The tab 37 fits under the reinforcing lip 36. After the tab has been inserted into slot 34, the other cooperating ends of the base and retaining ring are snapped into position by means of an upstanding latch element 38 formed in opposed side wall 23 and engaging with a notch 39 formed in the corresponding side wall of retaining ring 28. Since both the base and retaining ring are preferably formed of resilient plastic material, it can be seen that latch element 38 readily snaps into the notch 39 as this notch is cammed down over the inclined upper surface of the latch element.

To separate the retaining ring from the base, the latch element 38 may be manually moved outwardly to become disengaged from notch 39, whereupon the retaining ring may be lifted from its seated position on the base.

The filter element 27, as illustrated in FIGS. 1 to 3, is flat and may comprise a bottom layer of felt 40 and an upper layer 41 of a porous material which is chemical and weather resistant, such as a needled viscose felt. It is preferable that the material of the upper layer 41 be moldable into various shapes such as the filter element illustrated in FIG. 4 and indicated generally at 42.

When a flat filter element is employed, as shown in FIG. 2, the ribs 29 will support the inner portions of the filter element to prevent sagging and warping of the element.

It will be apparent that the knife edges of the flanges impressing into both sides of the filter element will enable the edge portions of the filter element to function as its own gasket.

With respect to FIGS. 4 and 5, a filter element 42 is shown assembled with the holder which is the same as that described above and illustrated in FIGS. 1 to 3. Filter element 42 similarly comprises two suitable layers of material which may be adhered at their edges to form a peripheral edge portion 43 and a bowed outwardly or domed inner portion 44. When the filter element 42 is positioned in the holder as shown in 43, the bowed portion 44 will project outwardly from the holder in the manner as shown. This modified filter element provides an increased filter area over the filter area of the flat filter element 27.

It will be apparent that other forms and structures of filter elements may be employed in the holder disclosed herein. However, it is preferred that the outer layer or surface of the filter element be formed of a moldable chemical and weather resistant material since the outer surface is exposed to the atmosphere.

It will be apparent that to replace a filter element, it is only necessary to disengage the retaining ring from the base in the manner as described above, remove the filter element, position a new filter element upon the flanges and then clamp the retaining ring in position as also described above.

Thus, it can be seen that the present invention provides a simple yet effective holder for a filter element and is particularly adapted for use in smaller engines. The simple structure of the holder considerably facilitates the replacement of the filter element and hence promotes the operating efficiency of the engine.

It is to be understood that variations may be made in details of the invention, without departing from the spirit of the invention, except as defined in the appended claims.

What is claimed is:

1. In a holder for retaining the filter element at the air intake of an internal combustion engine, the combination including a generally rectangular base with bottom and upstanding side walls, said bottom wall having an opening therein connectable to said air intake, a peripheral flange extending upwardly from and inwardly of said base side walls for supporting the edges of a filter element, a generally rectangular retaining ring having a peripheral groove mounted on the upper edges of said side walls and having a depending peripheral flange thereon spaced from said groove sleeved within said side walls and superposed to said base flange, a filter element interposed between and engaged by the flanges on said base and retaining ring, said base and retaining ring being of resilient plastic, one wall of said base having a slot therein and an overhang associated therewith, and another wall of said base having integral latch means thereon, and one wall of said ring having a tab thereon extending into said slot and under said underhang, and another wall of said ring having a notch therein cammingly receiving said latch means for flexibly and detachably clamping said retaining ring on said base side walls.

2. In a holder as claimed in claim 1 with said base and ring flanges being continuous.

3. In a holder as claimed in claim 1 with a filter element having the inner portion thereof bowed outwardly of said base to provide increased filter area.

4. In a holder as claimed in claim 1 with a filter element comprising an inner layer of felt and an outer layer of weather and chemical resistant porous material.

5. In a holder as claimed in claim 1, wherein one side wall of said base is longer than its opposing side wall and the other walls extend at an incline therebetween whereby the longer of said walls will overhang said other walls and protect the filter from liquid spilling thereover.

6. In a holder as claimed in claim 1 with said base comprising a plurality of upstanding ribs radiating from said base opening.

7. In a holder as claimed in claim 6 with the filter element being flat and the inner portion of the filter element being supported by said ribs.

References Cited

UNITED STATES PATENTS

| 1,983,866 | 12/1934 | Mikulasek | 55—515 |
| 2,521,984 | 9/1950 | Lang | 55—486 |
| 2,576,864 | 11/1951 | Valente | 210—491 |
| 2,731,104 | 1/1956 | Baker et al. | 55—FF |
| 2,966,234 | 12/1960 | Alexander | 55—501 |
| 2,980,204 | 4/1961 | Jordan | 55—FF |
| 2,994,404 | 8/1961 | Schifferly | 55—FF |
| 3,076,303 | 2/1963 | Durgeloh | 55—511 |
| 3,142,550 | 7/1964 | Kuehne | 55—FF |
| 3,373,546 | 3/1968 | Setnan | 55—501 |
| 3,385,039 | 5/1968 | Burke et al. | 55—501 |
| 3,400,520 | 9/1968 | Sakurai | 55—528 |

FRANK W. LUTTER, Primary Examiner

B. NOZICK, Assistant Examiner

U.S. Cl. X.R.

55—501, 511, 529